June 26, 1962
J. E. EDWARDS
3,040,823
SELF-CLEANING SOIL PUNCH
Filed June 15, 1959
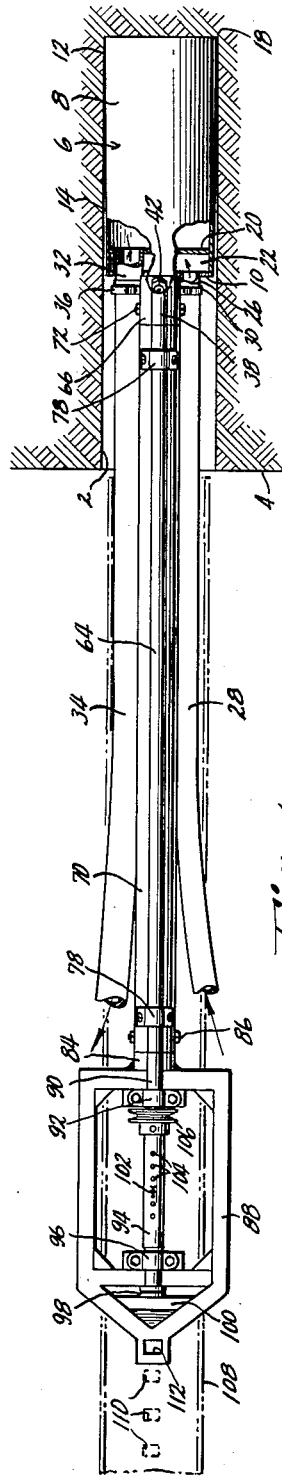
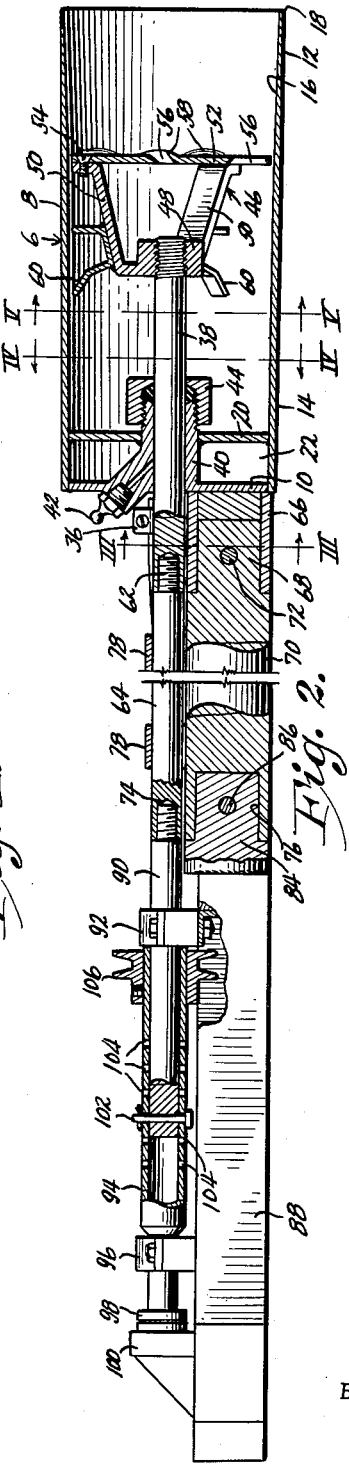
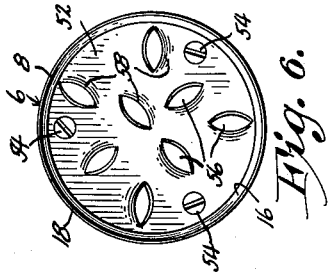
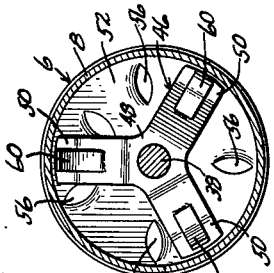
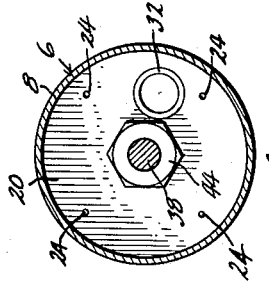
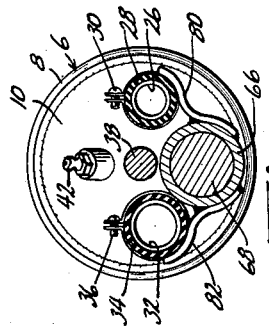
INVENTOR.
John E. Edwards
BY
John A. Hamilton
ATTORNEY.

3,040,823
SELF-CLEANING SOIL PUNCH
John E. Edwards, 425 Ruby Ave., Kansas City, Kans.
Filed June 15, 1959, Ser. No. 820,463
4 Claims. (Cl. 175—162)

This application is a continuation-in-part of my co-pending application Serial No. 595,969, now abandoned, filed July 5, 1956, and entitled "Earth Drilling Tool."

This invention relates to new and useful improvements in a soil punch or tool, and has particular reference to soil punches wherein the soil cut or loosened by the blade of the tool is flushed out of the hole hydraulically.

The principal object of the present invention is the provision of a self-cleaning soil punch of the class described wherein the water or other fluid employed to slush away the loosened soil does not contact the wall of the hole being punched, whereby the tool is adapted to punch a substantially dry-walled hole, and whereby erosion of the walls of the hole is prevented. The tool is primarily designed for punching horizontal holes under streets, highways, yards, and other places where normal excavation is impossible or undesirable, for the insertion of utility lines such as gas, water and sewer pipes, electrical conduits, and the like. However, due to the nature of its construction it is also adapted to punch vertical holes, and even overhead holes. It is not designed for use in rock or rocky soil, but is useful in any rock-free soil ranging from sandy soil or loose loam to hard clay.

Generally, this object is accomplished by positioning the blade within an open-mouthed or bell-shaped head, which is adapted to be pushed into the earth open end first, being propelled by a push rod. A drive shaft operating the blade within the head also extends to the ground surface for connection to a suitable source of power, and water is supplied to and exhausted from said head through conduits communicating with the surface of the ground. The projection of the head into the ground ahead of the blade forms a seal preventing escape of water from the interior of the head into the hole being punched. Other advantages of this construction are that it has very little vibration and is thus adapted for use in loose soils subject to cave-in by tools producing greater vibration, and that it is adaptable for use in making very long or deep holes since it does not have to lift long columns of earth from the hole as do auger-type drills. It operates with substantially the same power in long or deep holes at the terminal ends as is required in the initial portions of the holes. Also, the recessing of the blade within the head prevents it from contacting or damaging other utility lines or the like which may be present in the area.

Another object is the provision of a soil punch of the class described which is adapted to make long holes from restricted quarters, such as in making long horizontal holes from sides or bottoms of vertical excavations. This is accomplished by the insertion, as the hole is made, of short extension members in the push rod and drive shaft between the power end and blade end of the tool.

A further object is the provision, in a soil punch of the class described, of a head having a special configuration which tends to prevent lateral drifting of deviation of the head as the hole is advanced, and which tends to prevent rotation with the blade of the "plug" of earth within the head ahead of the blade.

A still further object is the provision of beaters or pulverizers for breaking up the earth cut by the blade, in order that the earth will be passed freely and efficiently through the exhaust conduit by the water flowing therethrough.

Still another object is the provision of means for adjusting the spacing between the blade and the open mouth of the head. In soft or sandy soils this spacing must be greater in order to provide the water sealing action previously discussed, and conversely in hard soils a smaller spacing is adequate. This adjustment may be made at the surface of the ground, without retracting the tool from the ground, as may be desired.

Other objects are simplicity and economy of construction, efficiency and dependability of operation, and adaptability for use in a wide variety of applications.

With these objects in view, as well as other objects which will appear in the course of the specification, reference will be had to the drawing, wherein:

FIG. 1 is a top plan view of a soil punch embodying the present invention, with parts broken away, showing the tool in operative relationship to an earth bank and making or punching a horizontal hole therein, FIG. 2 is an enlarged, foreshortened side elevational view of the tool as shown in FIG. 1, with parts broken away and parts shown in section, FIGS. 3, 4 and 5 are sectional views taken respectively on lines III—III, IV—IV and V—V of FIG. 2, and FIG. 6 is an end view of the open end of the tool head.

Like reference numerals apply to similar parts throughout the several views, and the numeral 2 applies to a circular hole being punched horizontally in the ground by the tool forming the subject matter of this invention, the surface of the ground from which the hole is being formed being indicated at 4. The tool itself includes a hollow, generally cylindrical head indicated generally by the numeral 6, having a circular wall 8 and being closed at its rearward end by a disc-like end wall 10 welded or otherwise secured therein. Head 6 is not precisely cylindrical. Externally, the forward end portion 12 is cylindrical, while the rearward portion 14 is tapered to a slightly smaller diameter at its rearward end, as clearly indicated in FIG. 1. Internally, the forward end portion of the head is taperingly reduced in diameter toward the rearward end thereof, as indicated at 16. The functions of these details of configuration will be fully described below. The forward end of the head forms a circular cutting edge 18.

In the rearward portion of head 6, in forwardly spaced relation from end wall 10, a circular disc-like wall 20 is welded into the head, forming a water distributing chamber 22 intermediate walls 10 and 20. A plurality of small holes 24 (see FIG. 4) are formed in wall 20 so as to direct jets of water from chamber 22 into the forward portion of the head. A water inlet pipe 26 is welded into end wall 10 so as to communicate with chamber 22, and extends rearwardly therefrom. A flexible water hose 28 is secured to the rearwardly extended end of said pipe by a hose clamp 30. A water exhaust pipe 32 extends through both of walls 10 and 20, being welded therein, so as to communicate with the portion of the head forward of wall 20 as shown in FIG. 1, and extends rearwardly from said head. A flexible exhaust hose 34 is secured to the rearwardly extended end of pipe 32 by hose clamp 36.

A drive shaft 38 is disposed axially in the head, being journalled in a bearing sleeve 40 extending through head walls 10 and 20. Said sleeve is provided with a grease fitting 42 whereby the bearing may be lubricated, and is provided forwardly of wall 20 with usual stuffing box 44. Within head 6, a blade mount 46 is mounted on the drive shaft. Said blade mount comprises a hub 48 rigidly threaded to the forward end of the shaft, and a plurality of forwardly divergent angularly spaced legs 50 extending forwardly from said hub. A flat, circular blade 52 is secured to the forward ends of legs 50 as by screws 54, being disposed concentrically with the head and at right angles to the axis thereof. A plurality of apertures 56 are formed in the blade, and the blade at the trailing edge of each of said apertures, as said blade is rotated by turning drive shaft 38, is offset forwardly to form a cutting edge 58. Hence when the forward face of the blade is urged against an earth surface and the blade is turned, the cutting edges 58 will cut earth from said earth surface and deliver it rearwardly through apertures 56. It will be noted also, as best shown in FIG. 6, that apertures 56 are spaced at various distances from the center of the blade, so that as the blade is operated as above described, the earth face against which the blade is pressed will be cut away over its entire area. An earth beater or pulverizer 60 is attached to each of legs 50 of blade mount 46, rearwardly of the blade. Each of said beaters comprises a substantially U-shaped strap having its base leg welded or otherwise affixed to leg 50, and its side legs extending radially outwardly to a point closely adjacent the head wall.

Drive shaft 38 extends rearwardly from head 6, and is threadably socketed at its rearward end to receive the threaded forward end 62 of a drive shaft extension section 64. Likewise, a socket member 66 is welded or otherwise fixed to the rearward side of head end wall 10, and is adapted to receive therein the reduced forward end portion 68 of a push rod section 70 therein, said push rod being secured non-rotatably in said socket by a bolt 72 extending transversely through the socket and rod. Drive shaft extension 64 extends rearwardly coaxially with the head, and push rod section 70 is parallel thereto, both being of equal length. Drive shaft extension 64 is threadably socketed at its rearward end as at 74, and push rod section 70 is socketed at its rearward end as at 76, for the addition of similar extensions. While only one extension is shown, it will be understood that any number desired may be used, as required by the longitudinal length of the hole 2 to be punched. Each push rod section 70 may be provided adjacent each end with a bearing guide 78 for the associated drive shaft section, in order that the push rod-drive shaft combination may be handled conveniently as a unit. Also, as shown in FIG. 3, a pair of cradle members 80 and 82 welded to socket member 66 respectively support hoses 28 and 34 adjacent the head, and similar cradle members may be affixed to each push rod section 70 at intervals along its length, to support said hoses.

The rear socket 76 of push rod section 70, or of the rearmost push rod section if more than one is in use, receives therein a plug member 84, the connection being secured by a bolt 86 extending transversely through the joint. Said plug member is welded to the forward end of an open rectangular frame 88 formed of heavy metal. The rearward socket 74 of drive shaft extension 64, or of the rearmost extension if more than one are in use, has the forward end of a shaft 90 threaded therein. Shaft 90 is journalled in a bearing 92 carried at the forward end of frame 88. Rearwardly of bearing 92, shaft 90 is telescoped slidably in a tubular sleeve 94, said sleeve being journalled in a bearing 96 carried adjacent the rearward end of frame 88, and supported against rearward movement by a thrust bearing 98 seated against a block 100 affixed to said frame. A pin 102 is inserted removably through shaft 90, and through any one of a series of matching holes 104 formed in sleeve 94, said holes being spaced longitudinally along said sleeve. A belt pulley 106 is fixedly mounted on sleeve 94, and is adapted to be operably connected by a belt to a suitable source of power, not shown.

A channel iron 108 having a series of holes 110 formed in the web thereof in longitudinally spaced relation is adapted to be supported rigidly adjacent and parallel to the tool, and frame 88 is provided with a hole 112 at its rearward end. A lever bar, not shown, may be inserted through hole 112 and one of holes 110, and tilted to advance the tool along the channel, to advance the blade into the earth as will be described.

In operation, hose 28 is connected with any suitable source of water under pressure, hose 34 is arranged to direct its discharge to any suitable dump area, and belt pulley 106 is connected by a belt to an engine or any other suitable source of power. The pulley acts through sleeve 94, pin 102, and shafts 90, 64 and 38 to rotate blade 52. The head 6 is then pushed against the ground in the direction it is desired to punch a hole, and is advanced by the lever bar means previously described or any other suitable method. The cutting edge 18 of the head is thereby pushed into the earth until the forward face of blade 52 contacts the soil, whereupon the rotation of the blade causes cutting edges 58 thereof to cut and deliver earth through blade apertures 56 to the rear of the blade. At the rear of the blade, the earth is thoroughly intermixed with water emerging in jets from holes 24, and is further subjected to the action of the whirling beaters 60, whereby it is reduced rapidly to the consistency of a smooth slurry which is forced out of the head through outlet pipe 32 and hose 34, which conveys it outside the hole being punched to a suitable dumping area for disposal. Beaters 60 are of course most essential when operating in hard clay or very cohesive soil, to break up the solid pieces of earth cut by the blade to prevent them from clogging the outlet passages. As the length or depth of hole 2 increases, extra push rod sections 70 and drive shaft extension sections 64 may be added as required.

It will be seen that as the tool is advanced, that portion of the head forward of blade 52 is always filled tightly with a plug of earth which has not as yet been cut and flushed away. This earth plug seems as a seal which prevents the escape of any water from the head. Thus the tool is adapted to punch an entirely dry-walled hole, and the walls thereof will not be washed out or eroded. This permits use of the tool in soil which otherwise could not be worked by hydraulic means due to danger of cave-in or collapse. In this connection it is noted also that the tool has very little vibration and is thereby still further adapted for use in soil subject to easy cave-in. The internal taper 16 of the head mouth subjects the earth plug therein to an increasing compressive load as it enters said head. This compressive loading increases the effectiveness of the water-sealing function of the earth plug, as previously described, and also defeats the tendency, noted in some soils, of the earth plug to break off at the mouth of the head and then to be rotated by the blade. This substantially stalls the tool as the blade is not then effective. The compressive loading of the plug by taper 16 prevents rotation of the earth plug in the mouth of the head. The externally cylindrical forward portion 12 of the head provides a guiding effect tending to insure that the tool will make a straight hole without lateral deviation or draft, as might for example otherwise occur if one side of said head should strike a zone of hard soil while the other side remained in relatively soft soil. The tapered rearward portion 14 of the head provides clearance from the wall of the hole being punched, thereby reducing the power required to advance the tool.

It will be readily apparent that the distance between blade 52 and the mouth of the head should be adjustable according to the type of soil being bored. For example in soft or sandy soils this spacing should be relatively great in order that the earth plug in the head mouth will be long enough to form an effective water seal as previously described. In hard soils, a shorter plug will form an effective seal, and advancing the head too far ahead of the blade will require more power. This adjustment, the need for which is reliably indicated to the operator by the force required to advance the tool, may be made without withdrawing the tool from the ground by first removing pin 102, then retracting either the drive shaft or the push rod until the hole in shaft 90 which receives pin 102 is aligned with the desired set of holes 104 in sleeve 94, and reinserting the pin. This adjustment is rapid and convenient, and greatly increases the efficiency of the tool by adapting it to the soil conditions actually encountered.

When the hole is completed, the tool is withdrawn. In most instances a plug of soil will remain in the mouth of the head during this operation, thereby preventing the drainage of water into the hole from the head and preserving the hole dry. As a further precaution, hose 28 may be connected to a source of compressed air prior to withdrawing the tool. In this manner most of the water may be removed from the system.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. A soil punch comprising a hollow tubular head open at one end only and adapted to be forced into the earth open end first, a cutting blade carried rotatably in said head and operable to cut into the earth substantially over the entire cross-sectional area of said head, means for rotating said blade, said blade being spaced inwardly from the open end of said head and constituting a disc rotatable coaxially with said head and having a diameter slightly less than the internal diameter of said head, said disc having apertures formed therein and a cutting edge adjacent each of said apertures and sloping toward the open end of said head, whereby when said blade is rotated said cutting edges will deliver earth through said apertures toward the closed end of said head, and means whereby water under pressure may be supplied to and exhausted from the interior of said head behind said blade.

2. A soil punch as recited in claim 1 wherein the apertures and cutting edges of said blade are disposed in overlapping relation measured radially from the center of said blade and extend from the center to the extreme edge thereof, whereby the entire circular area of earth to which said blade is applied will be cut away thereby.

3. A soil punch comprising a hollow tubular head open at one end only and adapted to be forced into the earth open end first, a cutting blade carried rotatably in said head and operable to cut into the earth substantially over the entire cross-sectional area of said head, said blade being spaced inwardly from the open end of said head, means whereby water under pressure may be supplied to and exhausted from the interior of said head behind said blade, a push rod affixed non-rotatively to the closed end of said head and extending parallel to the axis thereof, a drive shaft journalled at the closed end of said head coaxially therewith for rotation and axial sliding movement and extending parallel to said push rod, said drive shaft extending within said head and said blade being secured thereto, said push rod and said drive shaft being extended from said head, a frame fixed to the opposite end of said push rod, a drive member carried rotatably by said frame coaxially with said drive shaft, means for rotating said drive member, and means connecting said drive shaft to said drive member whereby said drive shaft is rotated, said connecting means being adjustable to permit longitudinal adjustment of said drive shaft relative to said drive member, whereby to adjust the spacing of said blade from the open end of said head.

4. A soil punch as recited in claim 3 wherein said drive member comprises a tubular sleeve in which said drive shaft is telescopingly engaged, and wherein said connecting means comprises a pin inserted transversely through said drive shaft and inserted selectively in any of a series of holes formed in said sleeve at longitudinally spaced intervals therealong.

References Cited in the file of this patent

UNITED STATES PATENTS

| 146,202 | Pontez | Jan. 6, 1874 |
| 196,009 | Haas et al. | Oct. 9, 1877 |
| 458,048 | Greathead | Aug. 18, 1891 |
| 682,939 | Ivens | Sept. 17, 1901 |
| 903,194 | Johanson | Nov. 10, 1908 |
| 1,932,239 | Berry | Oct. 24, 1933 |
| 2,319,512 | Parrish | May 18, 1943 |

FOREIGN PATENTS

| 270,014 | Great Britain | May 5, 1927 |
| 617,824 | Germany | Aug. 29, 1935 |